June 19, 1956
W. RATH
2,751,188
CERAMIC PRODUCT
Filed Feb. 25, 1950
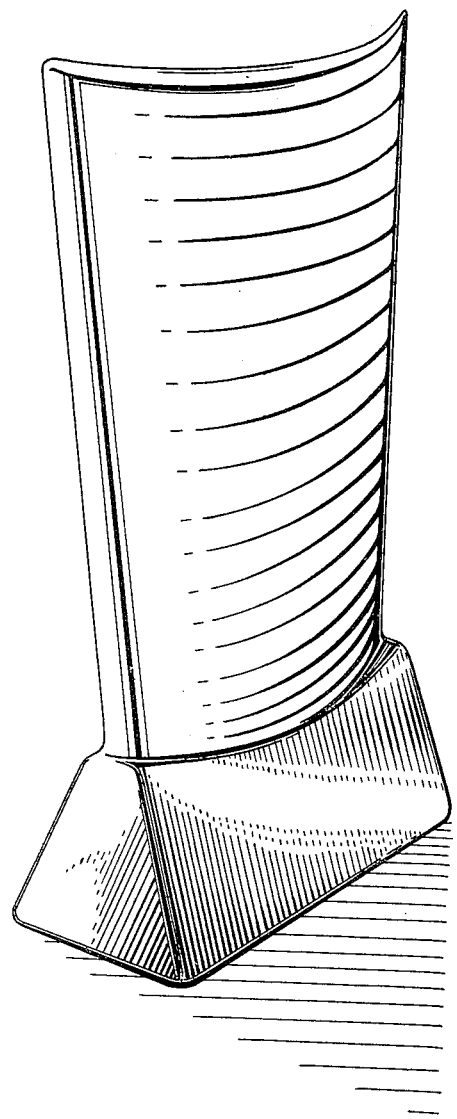
INVENTOR
BY WERNER RATH
*Marechal & Biebel*
ATTORNEYS United States Patent Office 2,751,188
Patented June 19, 1956

2,751,188

CERAMIC PRODUCT

Werner Rath, Lauf (Pegnitz), Germany, assignor to Maschinenfabrik Augsburg-Nürnberg, A. G., Augsburg, Germany, a corporation of Germany Application February 25, 1950, Serial No. 146,257

5 Claims. (Cl. 253—77)

This invention relates to a method of producing ceramic bodies, more particularly constructional parts for machines and engines, which have to meet very heavy requirements, e. g., very high mechanical strength and resistance to the effects of heat, and to the products of this method. Ceramic products of this kind are, for instance, blades of gas turbines, linings and elements of combustion chambers and heat exchangers and the like subjected in use to temperatures above 600° C. Ceramic materials of a high mechanical strength, having resistance to the effects of heat and being serviceable at such high temperatures are of a great importance in constructing machines of the character described, since normal steel loses its strength about 400° C. and high alloy steels are very expensive and difficult to work.

It is the object of the present invention to provide a method of making such ceramic bodies or machine parts of high resistance to the effects of heat and high thermal shock resistance.

With this object in view, according to the invention, a steatite base is utilized. An addition of 7 to 40 percent by weight (referring to the mixture) of silicon carbide, at least 50 percent of which have a particle size between 0.25 and 0.005 millimeter, is mixed with such base, and the resulting admixture is moulded and fired. Instead of the steatite base it is also possible to use a densely or compactly sintered base containing more than 40 percent of $Al_2O_3$. Moreover, other additions of high thermal conductivity materials which are resistant to oxidation, corrosion and scorification may be used instead of silicon carbide. Such additional materials include the carbides, borides and nitrides of titanium, zirconium, vanadium, columbium, tantalum, tungsten and molybdenum, as well as metallic silicon and ferro-silicon. A particularly important consideration for achieving very high mechanical strength characteristics of machine parts formed from such basic materials is maintaining very fine granulation or particle size of the additive materials of high thermal conductivity. Silicon carbide additions should have a particle size of less than 0.25 mm. Still higher strengths will be obtained by using additive material substantially all of which (instead of at least 50 percent as above noted) has a particle size of less than 0.06 mm., in which case the silicon carbide passes through a sieve of 10,000 meshes per square centimeter. In such cases an addition of from 18 to 40 percent is satisfactory. Particularly favorable are, for instance, the commercial granulations or particle signs of 280, 320 and 400 (according to the Norton Scale, indicating the number of meshes per linear inch). Extremely fine silicon carbide powder of a particle size of less than 0.005 mm. is unfavorable since the thermal shock resistance is deteriorated thereby. On the other hand, in case of coarser particle sizes the mechanical strength is deteriorated. It is appropriate to provide a distribution of the various particle sizes resulting in an optimum density or filling coefficient of the packed SiC particles, such as it is defined, for instance, by the well-known sieving curve of Fuller. The ceramic material should be fired at a temperature sufficiently high, for the particular mixture involved, that a potsherd, or structure at the breaking point, of maximum density results, with an absorption of water of less than 5 percent. However, even in case of an absorption of water up to 10 percent, mechanical values can be attained which are sufficient for many purposes. Moreover, advantageously the firing is carried out under reducing conditions to avoid a blown or blistered structure of the fired ceramic product.

After the conventional grinding and mixing of the said ingredients, the machine parts made and dried according to one of the well known processes (e. g. by casting or pressing) are at first superficially powdered with graphite dust of a low ash content and then embedded in a mixture of 10 to 70 percent of coarse graphite and 30 to 90 percent of quartz sand, thus assuring firing of the molded ceramic part in a reducing atmosphere. During the firing, especially in the higher temperature ranges at critical chemical or crystallographic conversion points as well-known for the various materials, the firing temperature is maintained, so as to promote the diffusion of carbon or silicon into the hollow spaces or cavities of the material. By carrying on the firing process in this way (i. e., with stepwise elevation of the firing temperature pausing at such conversion temperatures) it is possible to embed carbon or silicon in the pores or cavities which are filled with gas so as to reduce the differences of tension caused by such gas-filled cavities in case of a sudden change of temperature. Such controlled firing treatment results in a structure which becomes much denser, producing a maximum surface stability of the particles and considerably improving the mechanical strength of the finished ceramic part.

Since it is very important, for the sake of maintaining the favorable thermal conductivity during the sintering process, to avoid chemical transformation or decomposition of the additions of high thermal conductivity, it may be advisable to use basic substances whose sintering temperature is relatively low owing to the presence of a flux in the manner well known to those skilled in the ceramics art. To this end, for instance, either the well known natural steatite containing a substantial proportion iron may be used or suitable metals or metal compounds may be added in the mixing process, such as, barium carbonate, iron oxide, zinc-copper oxide.

The reduction of the temperature at which the ceramic base is sintered to a dense structure is of a decisive importance, since with such a mass a dense potsherd or ceramic structure is obtained even with SiC additions of more than 15 percent. Moreover, with such reduced firing temperatures and in connection with firing the ceramic part while imbedded in sand and graphite mixtures, the ceramic material is prevented from swelling or being inflated owing to chemical reactions between the constituents which are accompanied by the development of gas, such as would result in a porous or blistered structure disruptive of the fine tolerance surface contours desired with such products. Also oxidation of the SiC which may cause similar undesirable inflations, can thus be avoided. Finally, spontaneous crystallographic changes in the steatite base after the firing (e. g. a transformation of magnesium metasilicate proto-enstatite into clino-enstatite) is thus made impossible. Hence, the choice of suitable fluxes for facilitating the sintering process is of a decisive importance for the result of the process. Such fluxes are, for instance, alkaline earth, feldspar, zinc and copper compounds, boric acid, phosphoric acid and their salts and silicates of aluminum.

In this manner it is possible by suitable selection of the components of the mass, by appropriate arrangement and distribution of the non-uniformly shaped (e. g., flat and splintery) mineral components of uniform grain sizes with a small average diameter, and by embedding carbon in the empty pores, to obtain a finished ceramic product presenting a dense ceramic structure with little pore content having a high thermal conductivity and low thermal expansion, maximum mechanical strength and maximum resistance to thermal shocks.

EXAMPLE

Composition of the base

28% of steatite or soapstone of Göpfersgrün, calcined;
24% of steatite of Göpfersgrün, raw;
14% of magnesite;
6% of barium carbonate;
4% of iron oxide;
20% of clay from Bennstedt;
4% of active bentonite or colloidal clay;

Composition of the finished mass

84% of the base;
8% of silicon carbide 280 } according to Norton scale.
8% of silicon carbide 320 }

Preparation of the mass

The Göpfersgrün steatite is preliminarily fired at a temperature of 1160 to 1200° C., then disintegrated to a particle size passing screen No. 30 (according to Norton scale). Then the entire calcined steatite, raw steatite, magnesite, barium carbonate and iron oxide are disintegrated in a ball mill for about 24 hours, and the clay and bentonite are admixed to complete the composition of the base. Thereafter 8% of silicon carbide, 280, and 8% of silicon carbide, 320, are added, these percentages being calculated on 84% of the base, and ground for another 2 to 3 hours for the purpose of admixing or homogenization.

The workpieces are now moulded from the mass in known manner, as by casting, throwing or pressing. After drying, the surface of the bodies is thoroughly dusted over with graphite dust. Then bodies are embedded in a powder consisting of 60 parts by weight of graphite and 40 parts of quartz, and fired in a furnace in a reducing atmosphere at Sk 8–10 (1250–1300° C.), advantageously, during heating to and cooling from the firing temperature, maintaining each of the temperatures of 450, 570 and 1,000° C. for 2 to 3 hours as the furnace temperature is gradually raised to the above noted 1250° to 1300° C. If necessary, the parts may be finished by grinding.

An embodiment of a shaped body or machine part composed and produced in accordance with the invention is shown in the accompanying drawing, illustrating by way of example a turbine blade, but it will be understood that many other shaped bodies may be made by my novel method as well.

It should be noted that the ceramic products made in accordance with the invention can be worked by grinding. It is even possible to work the bodies in an intermediate stage of the manufacturing process, in a dry or fired state.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. The method of producing ceramic machine parts requiring low thermal expansion and high heat conductivity, mechanical strength, and resistance to thermal shocks particularly at temperatures above 600° C. and having densely compacted crystal structures substantially free of blisters and gas pocket cavities, which comprises the steps of admixing a steatite base material with 18% to 40% of the admixture by weight of silicon carbide having a particle size of from 0.005 to 0.06 millimeter as a high heat conductivity increasing component and a minor proportion of barium carbonate as a sintering temperature reducing component, molding the resulting admixture to form said machine part, admixing 10% to 70% by weight of powdered graphite with 90% to 30% by weight of powdered quartz, imbedding said molded part in said graphite-quartz admixture, firing said molded part thus imbedded at 1250° to 1300° C. under reducing conditions avoiding substantial chemical reaction and decomposition of said high heat conductivity component and swelling, blistering, and crystallographic changes within said part resulting therefrom, gradually cooling said part after firing, and maintaining during heating to and cooling from said firing temperature each of the temperatures of 450°, 570°, and 1000° C. for two to three hours effecting diffusion of carbon and silicon into said cavities in said molded part produced during said firing for enhancing mechanical strength and maximum surface stability of the particles of said part.

2. The method of producing ceramic machine parts requiring low thermal expansion and high heat conductivity, mechanical strength, and resistance to thermal shocks particularly at temperatures above 600° C. and having densely compacted crystal structure substantially free of blisters and gas pocket cavities, which comprises the steps of admixing a steatite base material with 7% to 40% of the admixture by weight of silicon carbide at least 50% of which has a particle size of from 0.25 to 0.005 millimeter as a high heat conductivity increasing component and a minor portion of barium carbonate as a sintering temperature reducing component, molding the resulting admixture to form said machine part, admixing 10% to 70% by weight of powdered graphite with 90% to 30% by weight of powdered quartz, imbedding said molded part in said graphite-quartz admixture, firing said molded part thus imbedded at 1250° to 1300° C. under reducing conditions avoiding substantial chemical reaction and decomposition of said high heat conductivity component and swelling, blistering, and crystallographic changes within said part resulting therefrom, gradually cooling said part, and maintaining during heating to and cooling from said firing temperature each of the temperatures of 450°, 570°, and 1000° C. for two to three hours effecting diffusion of carbon and silicon into said cavities in said molded part produced by said firing for enhancing mechanical strength and maximum surface stability of the particles of said part.

3. The method of producing ceramic machine parts requiring low thermal expansion and high heat conductivity, mechanical strength, and resistance to thermal shocks particularly at temperatures above 600° C. and having densely compacted crystal structure substantially free of blisters and gas pocket cavities, which comprises the steps of admixing a steatite base material with 7% to 40% of the admixture by weight of silicon carbide at least 50% of which has a particle size of from 0.25 to 0.005 millimeter as a high heat conductivity increasing component, molding the resulting admixture to form said machine part, admixing 10% to 70% by weight of powdered graphite with 90% to 30% by weight of powdered quartz, imbedding said molded part in said graphite-quartz admixture, firing said molded part thus imbedded at 1250° to 1300° C. under reducing conditions avoiding substantial chemical reaction and decomposition of said high heat conductivity component and swelling, blistering, and crystallographic changes within said part resulting therefrom, cooling said part, and maintaining during heating to and cooling from said firing temperature each of the temperatures of 450°, 570°, and 1000° C. for two to three hours effecting diffusion of carbon and silicon into any said cavities produced by said firing in said molded part for enhancing mechanical strength and maximum surface stability of the particles thereof.

4. A sintered ceramic turbine blade having a predetermined airfoil contour and adapted for use in a high speed, high temperature turbine and having low thermal expansion and high thermal conductivity, mechanical strength, and resistance to thermal shocks particularly above 600° C. and densely compacted crystal structure substantially free of gas pockets and swelling distortion comprising a major portion of about 60% to 93% of a steatite base material including magnesium metasilicate, a minor portion of about 40% to 7% of silicon carbide as a high thermal conductivity increasing component at least 50% of said silicon carbide before sintering having a particle size from 0.25 to 0.005 millimeter, and minor portions of carbon and of sintering reaction products of said constituents, cavities in said blade produced during sintering being substantially filled with carbon and silicon particles, and said blade being substantially free of surface irregularities and distortions of said predetermined airfoil contour following said sintering.

5. The method of producing ceramic machine parts requiring low thermal expansion and high heat conductivity, mechanical strength and resistance to thermal shocks particularly at temperatures above 600° C. and having densely compacted crystal structure substantially free of blisters and gas pocket cavities, which comprises the steps of admixing a steatite base material with 7% to 40% of the admixture by weight of silicon carbide at least 50% of which has a particle size of from 0.25 to 0.005 millimeter as a high heat conductivity increasing component, molding the resulting admixture to form said machine part, admixing 10% to 70% by weight of powdered graphite with 90% to 30% by weight of powdered quartz, imbedding said molded part in said graphite-quartz admixture, and firing said molded part thus imbedded at 1250° to 1300° C. under reducing conditions avoiding substantial chemical reaction and decomposition of said high heat conductivity component and effecting diffusion of carbon and silicon into any said cavities produced in said molded part during said firing.

References Cited in the file of this patent
UNITED STATES PATENTS

| | | |
|---|---|---|
| 1,444,162 | Beecher et al. | Feb. 6, 1923 |
| 1,982,012 | Mingard | Nov. 27, 1934 |
| 2,104,841 | White | Jan. 11, 1938 |
| 2,431,326 | Heyroth | Nov. 25, 1947 |
| 2,431,327 | Geiger | Nov. 25, 1947 |
| 2,431,660 | Gaudenzi | Nov. 25, 1947 |
| 2,475,565 | Houchins | July 5, 1949 |
| 2,581,252 | Goetzel et al. | Jan. 1, 1952 |

OTHER REFERENCES

Rogers: Introduction to the Study of Minerals and Rocks (1921), pp. 523, 524, 400, 401 and 364.